(12) United States Patent
Kim et al.

(10) Patent No.: US 8,994,913 B2
(45) Date of Patent: Mar. 31, 2015

(54) DISPLAY PANEL AND METHOD OF MANUFACTURING THE SAME

(75) Inventors: Myung-Hwan Kim, Yongin-si (KR); Chan-Uk Jon, Seoul (KR)

(73) Assignee: Samsung Display Co., Ltd., Yongin, Gyeonggi-Do (KR)

(*) Notice: Subject to any disclaimer, the term of this patent is extended or adjusted under 35 U.S.C. 154(b) by 1212 days.

(21) Appl. No.: 12/790,202

(22) Filed: May 28, 2010

(65) Prior Publication Data

US 2011/0175869 A1    Jul. 21, 2011

(30) Foreign Application Priority Data

Jan. 21, 2010    (KR) .................. 10-2010-0005400

(51) Int. Cl.
- *G02F 1/1339* (2006.01)
- *G02F 1/1333* (2006.01)
- *G02F 1/167* (2006.01)
- *G09G 3/34* (2006.01)

(52) U.S. Cl.
CPC .......... *G02F 1/133305* (2013.01); *G02F 1/167* (2013.01); *G09G 3/344* (2013.01); *G09G 2300/08* (2013.01); *G02F 2001/133388* (2013.01)
USPC .......................................... 349/190; 349/158

(58) Field of Classification Search
None
See application file for complete search history.

(56) References Cited

U.S. PATENT DOCUMENTS

| | | |
|---|---|---|
| 5,216,536 A | 6/1993 | Agrawal et al. |
| 2004/0150771 A1* | 8/2004 | Lee ................... 349/114 |
| 2007/0279572 A1* | 12/2007 | Yonemura .............. 349/153 |

FOREIGN PATENT DOCUMENTS

| | | |
|---|---|---|
| JP | 2002-169190 | 6/2002 |
| JP | 2007-518141 | 7/2007 |
| JP | 2007-219503 | 8/2007 |
| JP | 2009-229689 | 10/2009 |
| JP | 2009-230129 | 10/2009 |
| KR | 1020070085020 | 8/2007 |
| KR | 1020080055605 | 6/2008 |
| KR | 1020090103690 | 1/2009 |
| KR | 2009-0041795 | 4/2009 |
| KR | 1020090101122 | 9/2009 |

* cited by examiner

*Primary Examiner* — Richard Kim
(74) *Attorney, Agent, or Firm* — F. Chau & Associates, LLC

(57) ABSTRACT

A display panel includes a substrate, an electro-optical layer and a supporting layer. The substrate includes a display area and a peripheral area surrounding the display area. A thin-film transistor (TFT) part is formed in the display area. The electro-optical layer is disposed in the display area of the substrate. The supporting layer is disposed on the electro-optical layer and faces both the display area and the peripheral area, openings being formed through the supporting layer in the peripheral area. Accordingly, the supporting layer may prevent the substrate from sagging and may protect the gate circuit part.

5 Claims, 13 Drawing Sheets

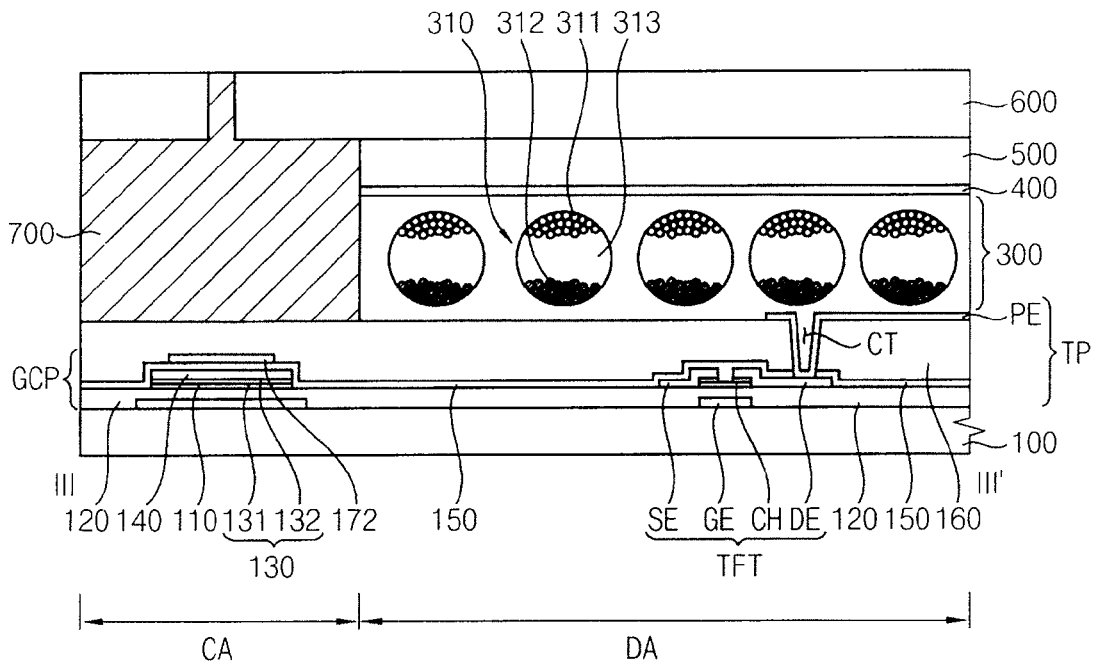
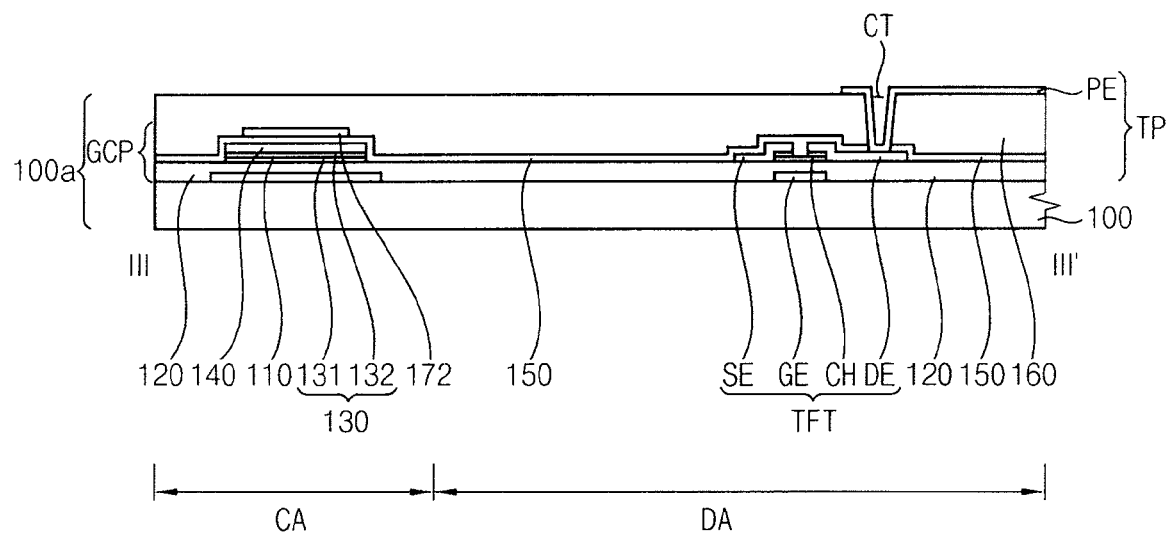

DISPLAY PANEL AND METHOD OF MANUFACTURING THE SAME

CROSS-REFERENCE TO RELATED APPLICATION

This application claims priority under 35 U.S.C. §119 to Korean Patent Application No. 2010-0005400, filed on Jan. 21, 2010, the disclosure of which is hereby incorporated by reference herein in it's entirety.

BACKGROUND OF THE INVENTION

1. Technical Field

The present disclosure relates to a display panel and to a method of manufacturing the display panel. More particularly, the present disclosure relates to a display panel capable of preventing a substrate from sagging and to a method of manufacturing the display panel.

2. Description of the Related Art

Generally, a liquid crystal display ("LCD") apparatus includes an LCD panel and a backlight assembly providing light to the LCD panel. The LCD panel may include an array substrate having a first base substrate and a plurality of thin-film transistors ("TFTs") formed on the first base substrate, a color filter substrate having a second base substrate and a color filter formed on the second base substrate, and a liquid crystal layer interposed between the array substrate and the color filter substrate.

As the TFTs may be manufactured at a high temperature, a glass substrate having a low cost, heat resistance and low thermal expansion coefficient are used as the base substrate of the LCD panel. However, the glass substrate may be fragile and may be limited to decrease thickness, so that the characteristics of the glass substrate may present difficulties with regard to increasing the size of the LCD apparatus or decreasing the weight of the LCD apparatus.

To overcome the above-mentioned difficulties, a plastic LCD apparatus has been recently developed, in which the glass substrate used as the base substrate of the LCD apparatus is substituted with a plastic substrate. As the plastic LCD apparatus employs a plastic film having a thickness thinner than the glass substrate employed in a conventional LCD apparatus, the plastic LCD apparatus may have a light weight, thin thickness and superior flexibility so that the plastic LCD apparatus may not be easily broken. In addition, the cost for manufacturing the plastic LCD apparatus may be decreased compared to other conventional LCD apparatuses.

In a method of manufacturing the plastic LCD apparatus, the plastic film may be laminated to a carrier substrate, and then after a process for manufacturing the TFT is completed, the plastic film may be stripped off from the carrier substrate.

However, after the plastic film is stripped off from the carrier substrate, the plastic film may be sagged due to the thin thickness thereof, so that various defects may be generated in manufacturing the LCD panel. In addition, when a relatively thicker plastic film is used to control of the sagging of the plastic film, the cost for manufacturing may increase.

SUMMARY OF THE INVENTION

The present invention may provide a display panel capable of preventing a substrate from sagging and protecting a gate circuit part.

The present invention may also provide a method of manufacturing the display panel.

According to one aspect of the present invention, a display panel includes a substrate, an electro-optical layer and a supporting layer. The substrate includes a display area and a peripheral area surrounding the display area. A thin-film transistor (TFT) part is formed in the display area. The electro-optical layer is disposed in the display area of the substrate. The supporting layer is disposed on the electro-optical layer and faces both the display area and the peripheral area. Openings are formed through the supporting layer in the peripheral area.

In an example embodiment, the display panel may further include a sealant sealing the substrate and the supporting layer.

In an example embodiment, the peripheral area may include a gate circuit part. The openings may be formed on the gate circuit part.

In an example embodiment, the sealant may be formed in the openings and may be formed between the gate circuit part and the supporting layer in the peripheral area. In addition, the sealant may be additionally formed on a portion of the substrate that does not overlap with the supporting layer.

In an example embodiment, a distance between the openings and an outermost line of the supporting layer may be less than about 3 mm.

In an example embodiment, the substrate may be a flexible substrate including at least one selected from a group consisting of a polyimide (PI) resin, a polyethersulfone (PES) resin, a polyethyleneterephthalate (PET) resin, a polyarylate (PAR) resin, and an acrylite resin.

In an example embodiment, the supporting layer may include at least one selected from a group consisting of a polyethyleneterephthalate (PET) resin, a polyarylate (PAR) resin, a polymethylmethacrylate (PMMA) resin, and a polycarbonate resin.

In an example embodiment, the TFT part may include a TFT electrically connected to gate and data lines formed on the substrate, an insulating layer formed on the TFT, and a pixel electrode electrically connected to the TFT through a contact hole formed through the insulating layer.

In an example embodiment, the display panel may further include a common electrode disposed between the electro-optical layer and the supporting layer.

In an example embodiment, the electro-optical layer may include an electrophoretic layer.

According to another aspect of the present invention, a display panel includes a substrate, an electro-optical layer, a supporting layer and a barrier layer. The substrate includes a display area and a peripheral area surrounding the display area. A TFT part is foamed in the display area. The electro-optical layer is disposed in the display area of the substrate. The supporting layer is disposed on the electro-optical layer. The barrier layer is disposed on the supporting layer and faces both the display area and the peripheral area. Openings are formed through the barrier layer in the peripheral area.

According to still another aspect of the present invention, a method of manufacturing a display panel is provided as follows. A TFT part is formed in a display area of a substrate. The substrate includes the display area and a peripheral area surrounding the display area. A common electrode is formed on a supporting layer in the display area. The supporting layer covers both the display area and the peripheral area, and openings are formed through the supporting layer in the peripheral area. The supporting layer having the common electrode formed on the supporting layer is attached to the substrate.

In an example embodiment, an electro-optical layer may be formed on the common electrode.

In an example embodiment, an electro-optical layer may be formed in the display area of the substrate including the TFT part.

In an example embodiment, a sealant may be injected into the openings to seal the substrate and the supporting layer.

In an example embodiment, the sealant may be additionally injected on a portion of the substrate that does not overlap with the supporting layer.

According to still another aspect of the present invention, a method of manufacturing a display panel is provided as follows. A TFT part is formed in a display area of a substrate. The substrate includes the display area and a peripheral area surrounding the display area. A common electrode and an electro-optical layer are formed on a first surface of a supporting layer. A barrier layer is formed on a second surface of the supporting layer. The barrier layer covers both the display area and the peripheral area, and openings are formed through the barrier layer in the peripheral area. The supporting layer having the barrier layer, the common electrode and electro-optical layer formed thereon is attached to the substrate to face the first surface of the supporting layer with the substrate.

In an example embodiment, a sealant may be injected into the openings to seal the substrate and the supporting layer having the barrier layer formed on the supporting layer.

According to the present invention, the supporting layer or the barrier layer covering the gate circuit part may prevent the substrate from sagging and may protect the gate circuit part. In addition, the sealant is injected into the openings that are formed through the supporting layer or the barrier layer, so that the display panel may be better sealed.

BRIEF DESCRIPTION OF THE DRAWINGS

The above and other features and advantages of the present invention will become more apparent by describing in detailed example embodiments thereof with reference to the accompanying drawings, in which:

FIG. 8 is a cross-sectional view illustrating the display panel taken along a line III-III' of FIG. 7; and FIGS. 9A to 9E are cross-sectional views illustrating a method of manufacturing the display panel of FIG. 7 according to an example embodiment of the present invention.

DETAILED DESCRIPTION OF THE EXAMPLE EMBODIMENTS OF THE INVENTION

Figure 1:
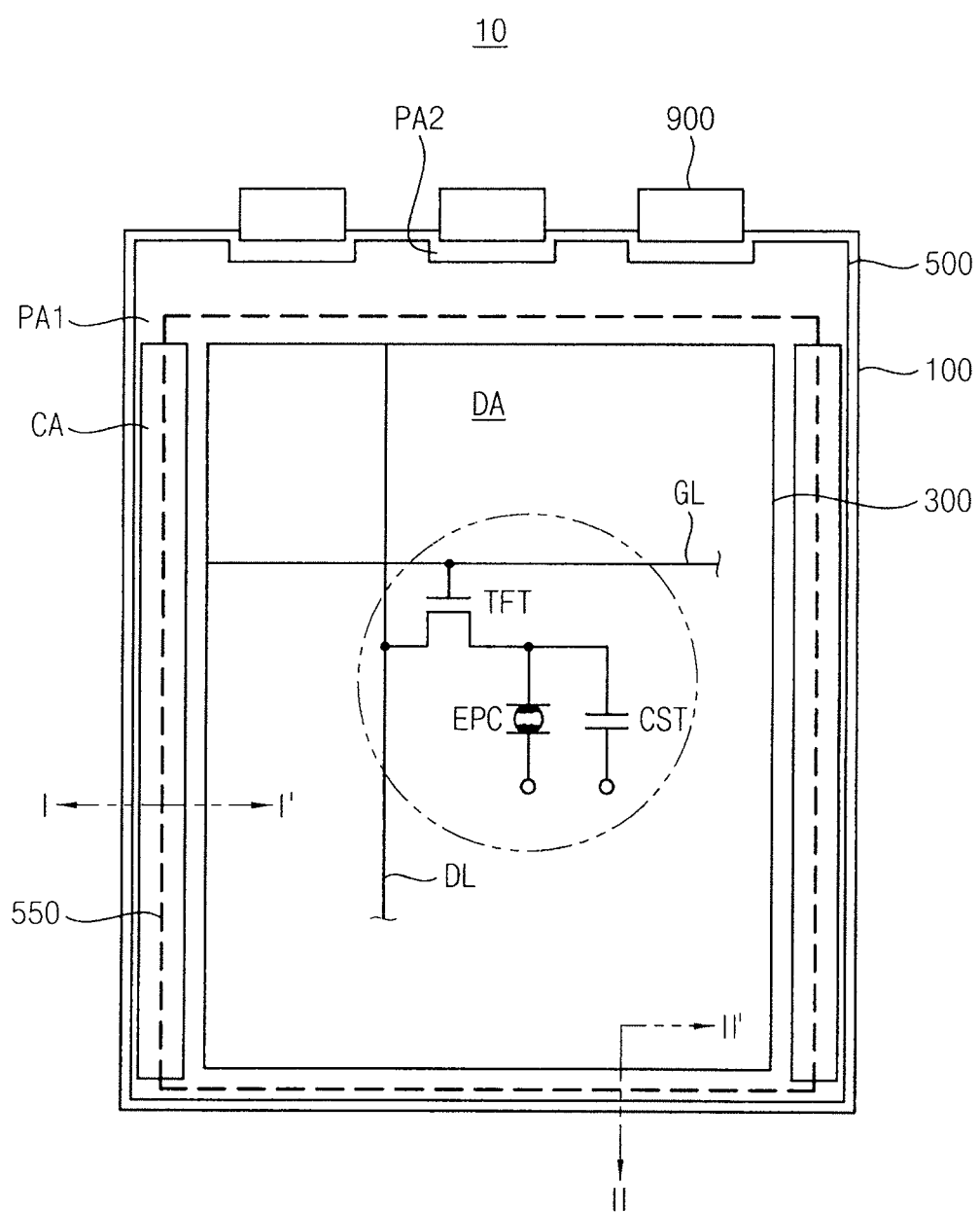
FIG. 1 is a plan view illustrating a display panel according to an example embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the tei ins "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
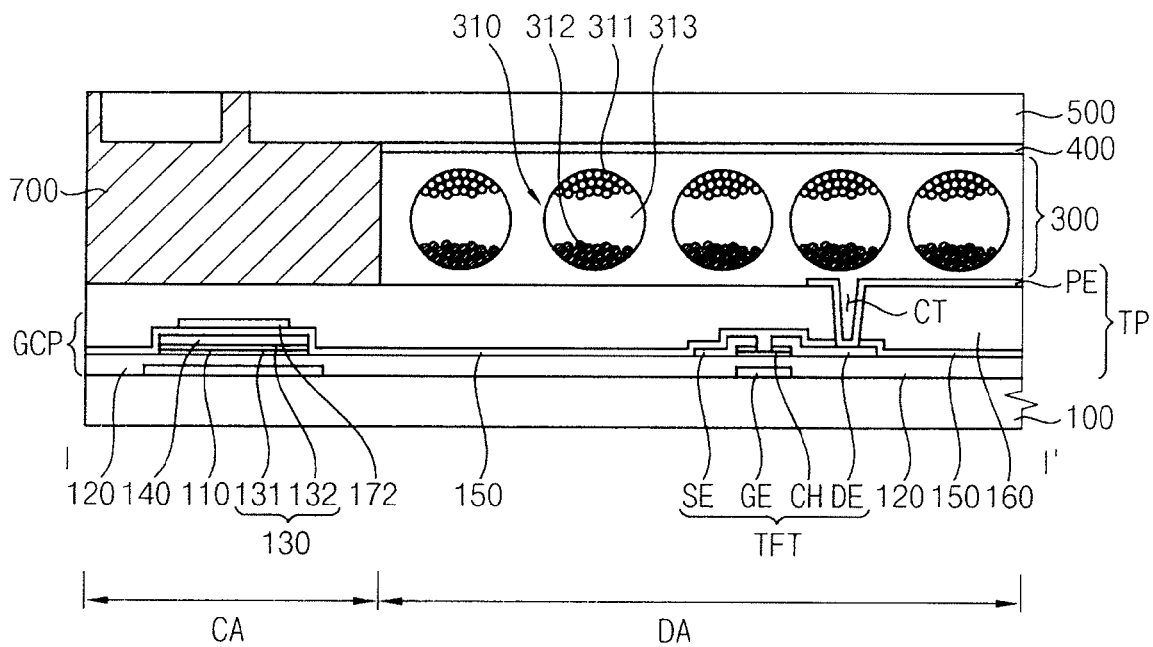
FIG. 2 is a cross-sectional view illustrating the display panel taken along a line I-I' of FIG. 1.
Figure 3:
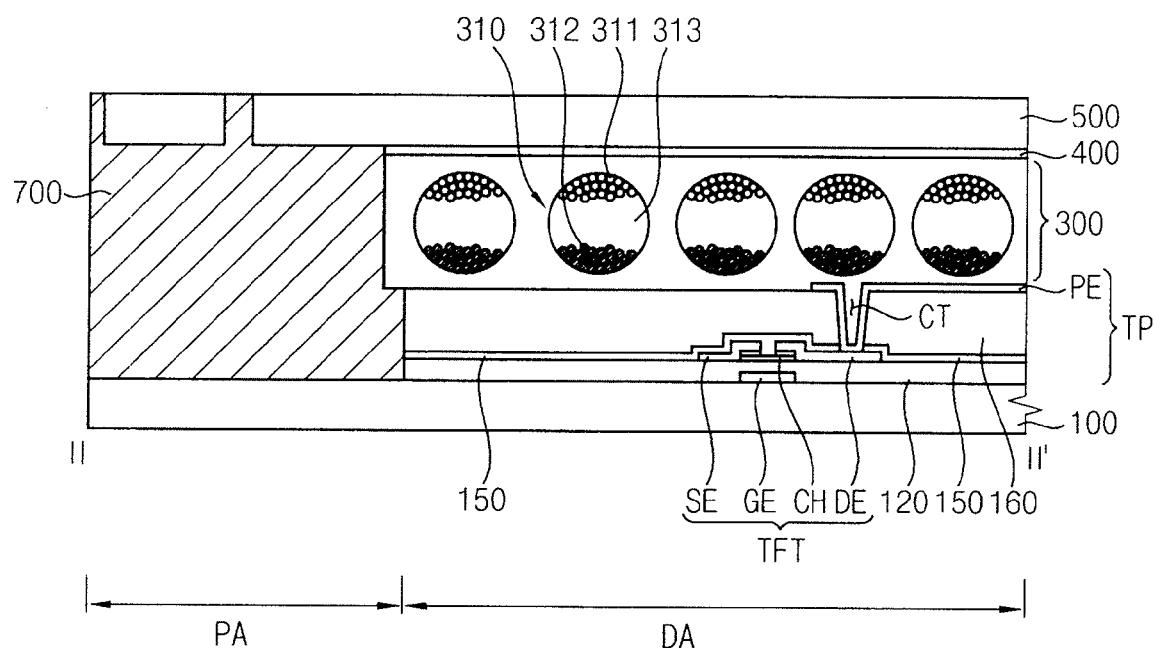
FIG. 3 is a cross-sectional view illustrating the display panel taken along a line II-II' of FIG. 1.

FIG. 1 is a plan view illustrating a display panel according to an example embodiment of the present invention. FIG. 2 is a cross-sectional view illustrating the display panel taken along a line I-I' of FIG. 1. FIG. 3 is a cross-sectional view illustrating the display panel taken along a line II-II' of FIG. 1.

Referring to FIG. 1, the display panel 10 includes a substrate 100, an electro-optical layer 300 and a supporting layer 500. The display panel 10 may further include a common electrode 400 disposed between the electro-optical layer 300 and the supporting layer 500. The display panel 10 may further include a flexible printed circuit board 900 electrically attached to a portion of the substrate 100.

The substrate 100 may include, for example, a flexible material. For example, the substrate 100 may include a plastic material having good light transmissivity, heat-resistance, chemical-resistance, mechanical strength, and so on. For example, the plastic material used to form the substrate 100 may include at least one of a polyimide (PI) resin, a polyethersulfone (PES) resin, a polyethyleneterephthalate (PET) resin, a polyarylate (PAR) resin, an acrylite resin, and combination thereof. For example, the substrate 100 may have thickness between about 10 μm and about 50 μm.

The substrate 100 includes a display area DA and a peripheral area surrounding the display area DA.

The display area DA includes data lines DL and gate lines GL crossing each other and pixel portions P. Each of the pixel portions P includes a thin-film transistor TFT electrically connected to the gate and data lines GL and DL corresponding to each of the pixel portions P, an electrophoretic capacitor EPC electrically connected to the thin-film transistor TFT, and a storage capacitor CST electrically connected to the electrophoretic capacitor EPC.

A thin-film transistor part TP is formed in the display area DA. The thin-film transistor part TP includes a gate electrode GE, a gate insulating layer 120, a channel portion CH, a source electrode SE, a drain electrode DE, a protective insulating layer 150, an organic insulating layer 160, and a pixel electrode PE.

The gate electrode GE is formed to be extended from a gate line GL, and the gate insulating layer 120 is formed on the gate line GL and the gate electrode GE. The channel portion CH includes an active layer 131 having amorphous silicon a-Si and a resistant contact layer 132 having amorphous silicon (a-Si) doped with N type dopants at a high concentration (n+a-Si).

The source and drain electrodes SE and DE are foamed on the channel portion CH, separated from each other. The source and drain electrodes SE and DE are electrically connected with each other through the channel portion CH. The source electrode SE is formed to be extended from the data line DL, and the drain electrode DE is electrically connected to the pixel electrode PE through a contact hole CT. Thus, the thin-film transistor TFT having the gate electrode GE, the channel portion CH, the source electrode SE and the drain electrode DE, is formed.

The thin-film transistor TFT is a bottom gate thin-film transistor which includes the gate electrode GE formed under the source and drain electrodes SE and DE. Alternatively, the thin-film transistor TFT may be a top gate thin-film transistor which includes the gate electrode formed over the source and drain electrodes.

The protective insulating layer 150 and the organic insulating layer 160 are formed on the substrate 10 on which the thin-film transistor TFT is formed, and include the contact hole CT through which a portion of the drain electrode DE is exposed. The organic insulating layer 160 may include, for example, a transparent organic insulating material.

The pixel electrode PE is formed on the organic insulating layer 160 and is electrically connected to the drain electrode DE through the contact hole CT.

The peripheral area includes a first peripheral area PA1 corresponding to a portion of the gate lines GL and a second peripheral area PA2 corresponding to a portion of the data lines DL. The flexible printed circuit board 900 is attached to the second peripheral area PA2. The first peripheral area PA1 includes a circuit area CA in which a gate circuit part GCP outputting a gate signal to the gate lines GL is integrated.

The circuit area CA includes the gate circuit part GCP electrically connected to the plurality of the thin-film transistors TFT and the organic insulating layer 160.

The gate circuit part GCP includes a gate metal layer 110, the gate insulating layer 120, a channel layer 130, a source metal layer 140, the protective insulating layer 150, a contact electrode 172, and the organic insulating layer 160. The gate circuit part GCP and the thin-film transistor part TP may be formed via the same manufacturing process at the same time.

The electro-optical layer 300 is attached to the display area DA to overlap with the display area DA. For example, when viewed on the plane, the electro-optical layer 300 may be protruded from the display area DA by about 0.5 mm considering a manufacturing margin.

The electro-optical layer 300 may be, for example, an electrophoretic layer including electrophoretic molecules charged with a positive (+) charge and a negative (−) charge. In this case, the electro-optical layer 300 includes a plurality of microcapsules 310 and a binder binding the microcapsules 310. Each of the microcapsules 310 includes the electrophoretic molecules charged with the positive (+) and negative (−) charges.

For example, the microcapsule 310 includes a white ink particle 311 charged with the negative (−) charge or the positive (+) charge, a black ink particle 312 charged with the positive or negative charge opposite to the white ink particle 311, and a transparent dielectric 313. For example, the white ink particle 311 is charged with the positive (+) charge, and the black ink particle 312 is charged with the negative (−) charge. The light incident from outside is directly reflected by the white ink particle 311 to display white color.

The common electrode 400 is formed on the electro-optical layer 300 to face the pixel electrode PE. The common electrode 400 includes, for example, a transparent conductive material. The common electrode 400 is opposite to the pixel electrode PE, and a common voltage is applied to the common electrode 400. The common electrode 400 may include the transparent conductive material, such as, for example, indium tin oxide (ITO), indium zinc oxide (IZO), amorphous indium tin oxide (a-ITO), and combination thereof.

The supporting layer 500 is formed on the substrate 100 on which the common electrode 400 is formed. The supporting layer 500 covers the display area DA and the gate circuit part GCP.

When viewed on the plane, the supporting layer 500 may cover the display area DA and almost all of the peripheral area PA of the substrate 100. The supporting layer 500 may have substantially the same shape as the substrate 100 or a diminished shape of the substrate 100.

For example, the supporting layer 500 may be diminished with respect to the substrate 100 by about 0.1 mm. In addition, the second peripheral area PA2 may include a portion that does not overlap with the supporting layer 500 for an outer lead bonding (OLB) process. In the OLB process, the flexible printed circuit board 900 is electrically attached to the second peripheral area PA2.

The supporting layer 500 includes openings 550 formed in the peripheral area. The openings 550 may be formed between an outermost line of the display area DA and an outermost line of the supporting layer 500. For example, the openings 550 may be formed over the gate circuit part GCP.

The openings 550 may be varied in shape, such as, for example, a rectangular shape, a tetragonal shape, a circular shape, and so on. In addition, the openings 550 may have shapes substantially the same with each other or may have shapes different from each other.

The openings 550 may be formed within about 3 mm from the outermost line of the supporting layer 500. The openings 550 may be formed adjacent to at least one sides of the supporting layer 500. For example, the openings 550 may be formed adjacent to the sides of the supporting layer 500. The openings 550 may be uniformly spaced apart from the outermost line of the supporting layer 500 by a predetermined distance.

The openings 550 may be porous shapes spaced apart from each other by a predetermined distance. The openings 550 may be arranged in one or more lines.

The openings 550 may be full of a sealant 700 that will be described later.

The supporting layer 500 covers the peripheral area including the gate circuit part GCP as well as the display area DA, so that the substrate 100 may be prevented from sagging. In addition, the supporting layer 500 covers the gate circuit part GCP to function as a barrier layer, so that damage resulting from, for example, moisture, light, heat, chemical impact, etc., may be prevented.

The supporting layer 500 may include, for example, at least one of a polyethyleneterephthalate (PET) resin, a polyarylate (PAR) resin, a polymethylmethacrylate (PMMA) resin and a polycarbonate resin, and combination thereof. For example, the supporting layer 500 may have thickness between about 220 μm and about 250 μm.

The sealant 700 may be, for example, an ultraviolet-ray curing resin. The sealant 700 is formed between the substrate 100 and the supporting layer 500 in the peripheral area to seal the substrate 100 and the supporting layer 500.

As shown in FIG. 2, the sealant 700 is formed in the openings 550 and is formed between the gate circuit part GCP and the supporting layer 500. In addition, when the supporting layer 500 has the diminished shape of the substrate 100, the sealant 700 is formed on a portion the substrate 100 that does not overlap with the supporting layer 500.

As shown in FIG. 3, the electro-optical layer 300 is not formed in the peripheral area, so that the sealant 700 may be formed in the openings 550 of the supporting layer 500 and may be formed between the substrate 100 and the supporting layer 500 in the peripheral area.

The sealant 700 may be injected into the openings 550 of the supporting layer 500. For example, the maximum moving distance of the sealant 700 may be about 3 mm. In this case, when the openings 550 are formed within about 3 mm from the outermost line of the supporting layer 500, the sealant 700 injected into the openings 550 may be formed into the portion of the substrate 100 that does not overlap with the supporting layer 500.

When the distance between the openings 550 and the outermost line of the supporting layer 500 is more than about 3 mm, the sealant 700 may be additionally injected on the portion the substrate 100 that does not overlap with the supporting layer 500 after injecting the sealant 700 into the openings 550.

The sealant 700 is formed in the peripheral area to seal the substrate 100 and the supporting layer 500. In addition, the sealant 700 is formed on the gate circuit part GCP, so that the sealant 700 functions as a barrier layer blocking, for example, moisture, light, heat, chemical impact, etc.

Figure 4:
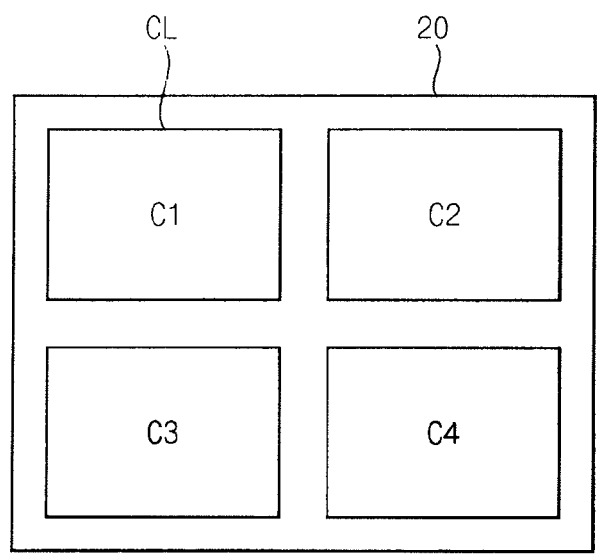
FIG. 4 is a plan view illustrating a carrier substrate for manufacturing the display panel of FIG. 1.

FIG. 4 is a plan view illustrating a carrier substrate for manufacturing the display panel of FIG. 1. FIGS. 5A to 5G are cross-sectional views illustrating a method of manufacturing the display panel of FIG. 1 according to another example embodiment of the present invention.

Referring to FIG. 4, the carrier substrate 20 may include a rigid type material that is suitable to a high temperature process. For example, the carrier substrate 20 may be a glass substrate. A cutting line CL is formed on the carrier substrate 20, which defines a plurality of display cell areas C1, C2, C3 and C4. The substrate 100 is formed on each of the display cell areas C1, C2, C3 and C4, via additional processes.

A plastic film may be laminated to the carrier substrate 20 to form the substrate 100. Alternatively, a resin material may be coated on the carrier substrate 20 and then may be cured to form the substrate 100.

Figure 5A:
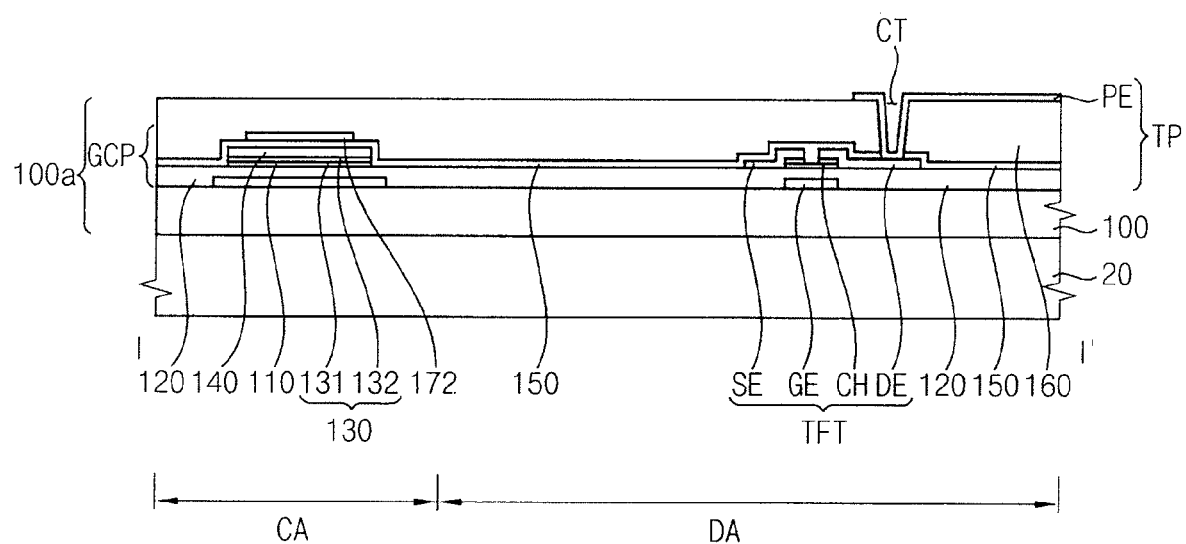
FIGS. 5A to 5G are cross-sectional views illustrating a method of manufacturing the display panel of FIG. 1 according to an example embodiment of the present invention.

Referring to FIGS. 1, 4 and 5A, the thin-film transistor part TP is formed in the display area DA and the gate circuit part GCP is formed in the circuit area CA.

For example, a first metal layer is deposited and patterned on the substrate 100 to form the gate electrode GE and the gate line GL in the display area DA and to form the gate metal layer 110 in the circuit area CA. The gate metal layer 110 includes gate electrodes of a plurality of thin-film transistors forming the gate circuit part GCP.

The gate insulating layer 120 is formed on the substrate 100 on which the gate pattern is formed. The gate insulating layer 120 is formed in the display area DA and the circuit area CA in common.

The active layer 131 having amorphous silicon (a-Si) and the resistant contact layer 132 having amorphous silicon doped with N type dopants at a high concentration (n+a-Si), are sequentially deposited on the gate insulating layer 120 and patterned to form the channel portion CH in the display area DA and to form the channel layer 130 in the circuit area CA.

A second metal layer is deposited on the substrate 100 on which the channel portion CH and the channel layer 130 are formed, and patterned to form the data line DL, the source electrode SE and the drain electrode DE in the display area DA and to form the source metal layer 140 in the circuit area CA. The source metal layer 140 includes the source and drain electrodes of the plurality of the thin-film transistors forming the gate circuit part GCP.

The protective insulating layer 150 is formed on the substrate 100 on which the source pattern is formed. The protective insulating layer 150 is formed in the display area DA and the circuit area CA in common. Then, the organic insulating layer 160 having the transparent organic insulating material is formed in the display area DA and the circuit area CA.

The organic insulating layer 160 and the protective insulating layer 150 formed in the display area DA are patterned to form the contact hole CT. The protective insulating layer 150 and the gate insulating layer 120 formed in the circuit area CA are patterned to form a plurality of contact holes.

The transparent conductive material is deposited on the substrate 100 on which the contact holes are formed, and patterned to form the pixel electrode PE in the display area DA and to form the contact electrode 172 in the circuit area CA.

Accordingly, the thin-film transistor part TP is formed in the display area DA, and the gate circuit part GCP is formed in the circuit area CA. Based on the above, an array substrate 100a is manufactured.

Figure 5B:
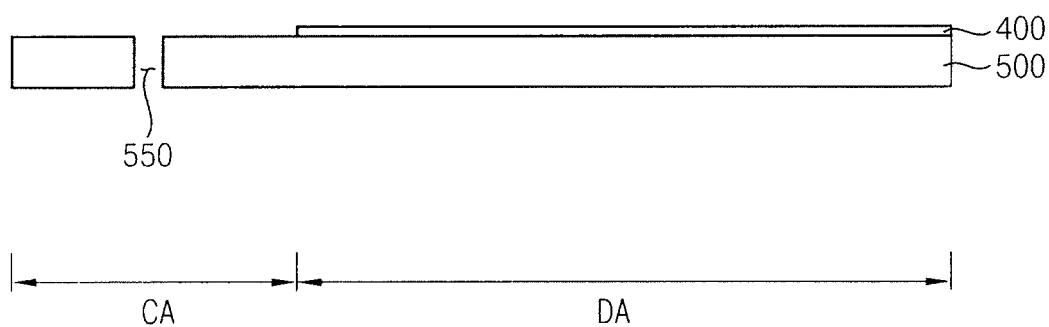

Referring to FIGS. 1, 4 and 5B, the common electrode 400 is formed on the supporting layer 500 including the openings 550, corresponding to the peripheral area.

The common electrode 400 is formed to correspond to the display area DA of the array substrate 100a. The common electrode 400 may be formed by, for example, a sputtering method, an electron-beam method, an ion-plating method, a vacuum plating method a chemical vapor deposition method, and so on.

The common electrode 400 includes the transparent conductive material. The common electrode 400 is opposite to the pixel electrode PE, and the common voltage is applied to the common electrode 400. The common electrode 400 may include the transparent conductive material, such as, for example, indium tin oxide (ITO), indium zinc oxide (IZO), amorphous indium tin oxide (a-ITO), and combination thereof.

Figure 5C:
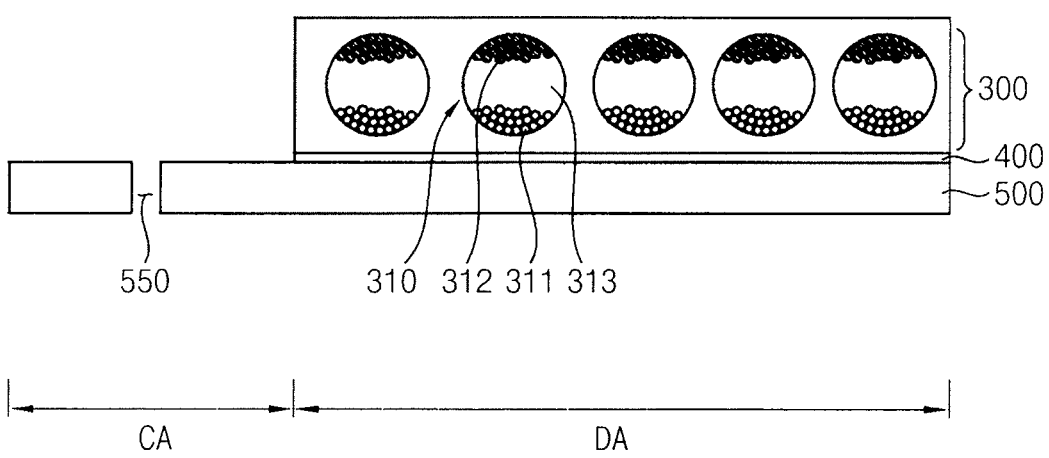

Referring to FIGS. 1, 4 and 5C, the electro-optical layer 300 is formed on the supporting layer 500 on which the common electrode 400 formed.

The electro-optical layer 300 may be the electrophoretic layer including the electrophoretic molecules charged with the positive (+) charge and the negative (−) charge. The electro-optical layer 300 is formed corresponding to the display area DA of the array substrate 100a. For example, when viewed on the plane, the electro-optical layer 300 may be protruded from the display area DA by about 0.5 mm considering the manufacturing margin.

Figure 5D:
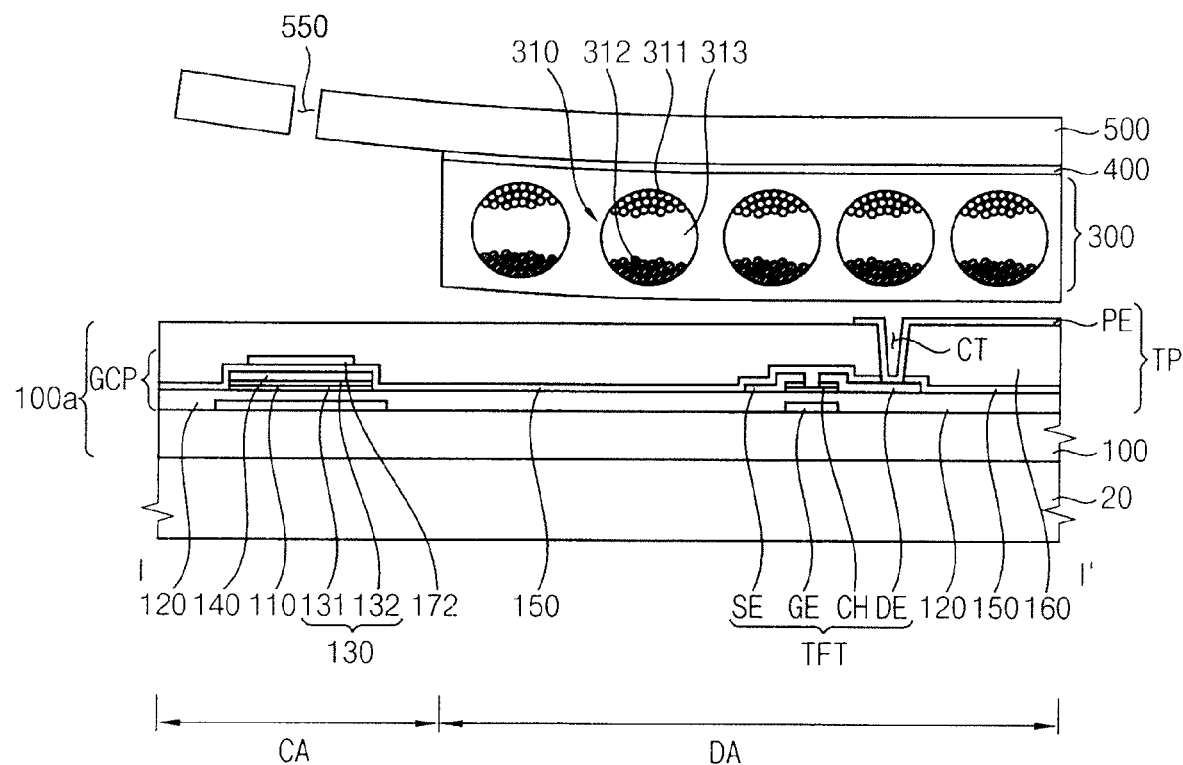

Referring to FIGS. 1, 4 and 5D, the supporting layer 500 including the common electrode 400 and the electro-optical layer 300 is laminated to the array substrate 100a.

Figure 5E:
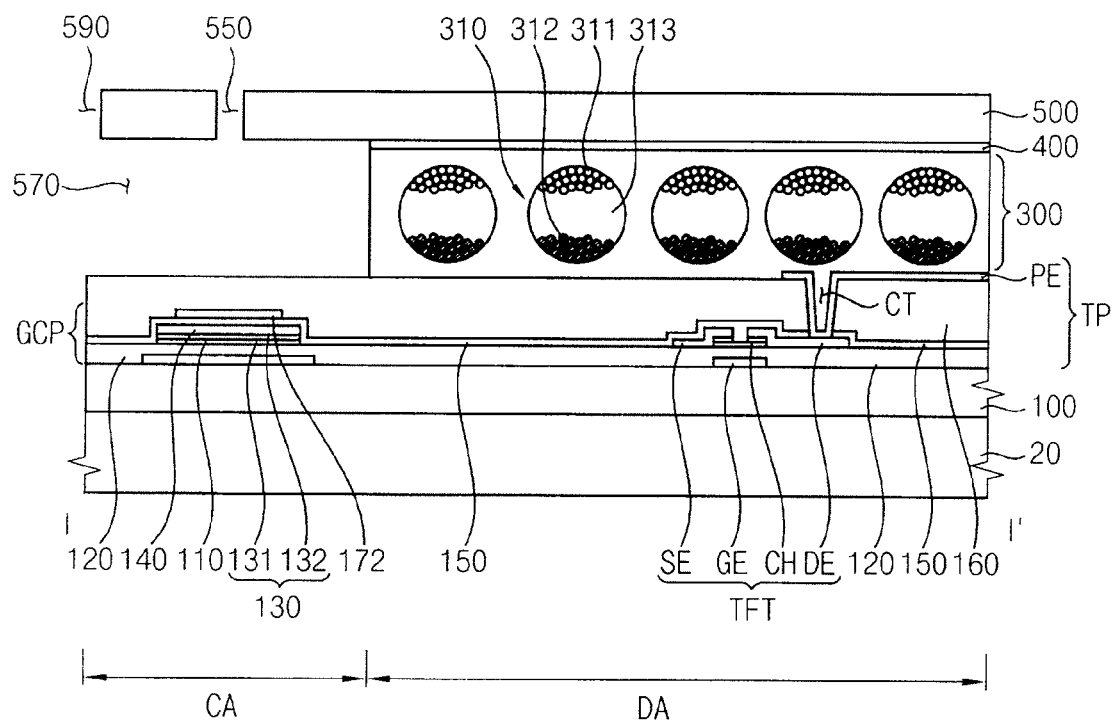

FIG. 5E is a cross-sectional view illustrating the display panel after the supporting layer 500 is laminated to the array substrate 100a. The supporting layer 500 covers the display area DA and the gate circuit part GCP. When viewed on the plane, the supporting layer 500 may cover the display area DA and almost all of the peripheral area of the substrate 100. The supporting layer 500 may have substantially the same shape as the substrate 100 or a diminished shape of the substrate 100.

The supporting layer 500 includes the openings 550 formed on the peripheral area. For example, the openings 550 may be formed over the gate circuit part GCP.

The electro-optical layer 300 is not formed in the peripheral area, so that an empty space 570 may be formed between the substrate 100 and the supporting layer 500 in the peripheral area. In addition, when the supporting layer 500 has the diminished shape of the substrate 100, a non-overlapping area 590 that does not overlap with the substrate 100 may be formed. The empty space 570 may be linked with the openings 550 and the non-overlapping area 590.

Figure 5F:
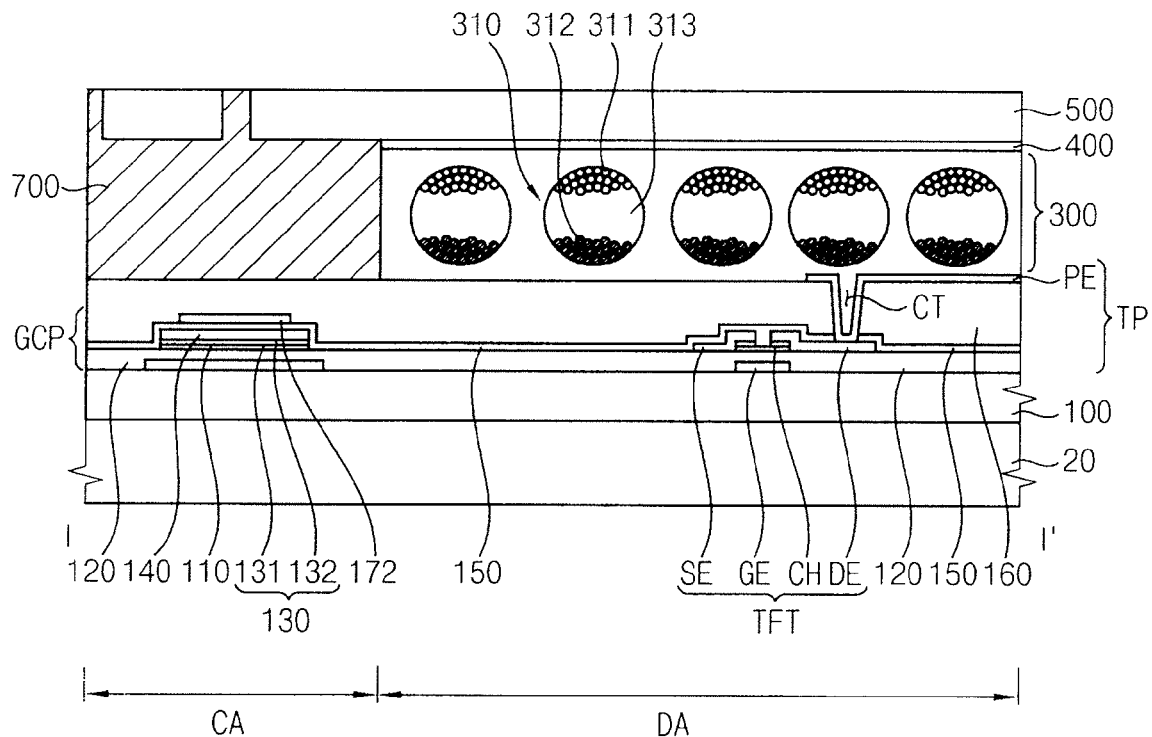

Referring to FIGS. 1, 4 and 5F, the sealant 700 is injected into the openings 550 of the supporting layer 500. The sealant 700 is injected into the openings 550 to fill the openings 550, the empty space 570 and the non-overlapping area 590.

When the distance between the openings 550 and the outermost line of the supporting layer 500 is more than the predetermined distance, the sealant 700 may be additionally injected through the non-overlapping area 590 after injecting the sealant 700 into the openings 550.

The sealant 700 may be, for example, the ultraviolet-ray curing resin. The sealant 700 is formed between the substrate 100 and the supporting layer 500 in the peripheral area to seal the substrate 100 and the supporting layer 500. In addition, the sealant 700 is formed on the gate circuit part GCP, so that the sealant 700 functions as the barrier layer blocking, for example, moisture, light, heat, chemical impact, etc.

Then, the OLB process is performed, and in the OLB process, the flexible printed circuit board 900 is attached to the second peripheral area PA2. An end portion of the flexible printed circuit board 900 is attached to a pad portion formed at the second peripheral area PA2 using a conductive adhesive.

The OLB process may be performed before the carrier substrate 20 is removed from the substrate 100, or may be performed after the carrier substrate 20 is removed from the substrate 100.

Figure 5G:
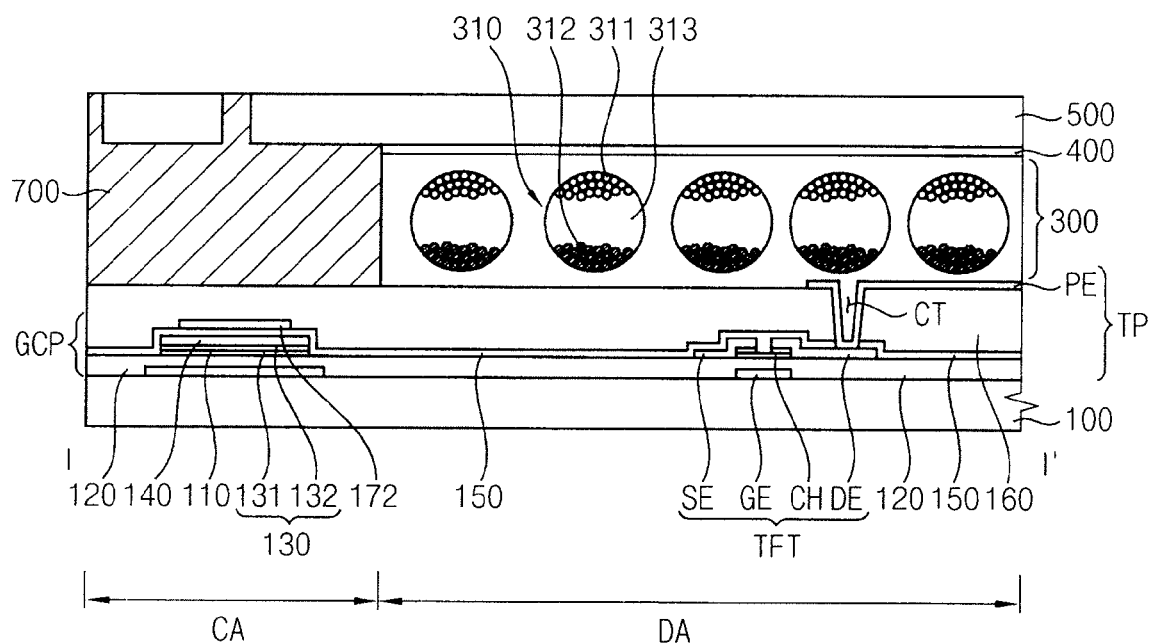

Referring to FIGS. 1, 4 and 5G, the carrier substrate 20 is removed from the substrate 100.

The carrier substrate 20 may be removed from the substrate 100 using, for example a removing layer formed between the carrier substrate 20 and the substrate 100. The removing layer may be transformed and damaged by a laser beam, so that the carrier substrate 20 may be removed from the substrate 100.

The removing layer may include, for example, an inorganic insulation material. The inorganic insulation material may include, for example, silicon nitride (SiNx), silicon oxide (SiOx) or silicon oxide nitride (SiOxNy), and so on. Alternatively, the removing layer may include, for example, an organic insulation material. The organic insulation material may include, for example, a polyimide (PI) resin series, an acrylite resin series, etc.

The supporting layer 500 formed on the substrate 100 may prevent the substrate 100 from sagging after the substrate 100 is separated from the carrier substrate 20

FIGS. 6A to 6E are cross-sectional views illustrating a method of manufacturing the display panel of FIG. 1 according to still another example embodiment of the present invention. In the method of manufacturing the display panel according to the present example embodiment, substantially the same elements as in FIGS. 5A to 5G are referenced to using the same reference numerals, and further description for substantially the same elements will be omitted. In addition, description for the carrier substrate 20 will be omitted.

Figure 6A:
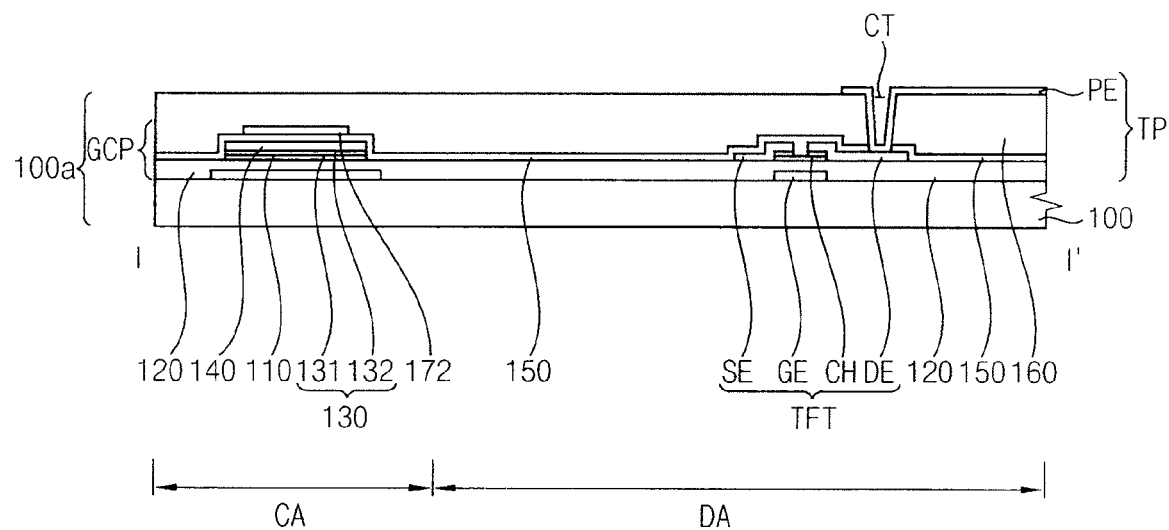
FIGS. 6A to 6E are cross-sectional views illustrating a method of manufacturing the display panel of FIG. 1 according to an example embodiment of the present invention.

Referring to FIGS. 1 and 6A, the thin-film transistor part TP is formed in the display area DA and the gate circuit part GCP is formed in the circuit area CA of the peripheral area, on the substrate 100. Based on the above, the array substrate 100a is manufactured.

Figure 6B:
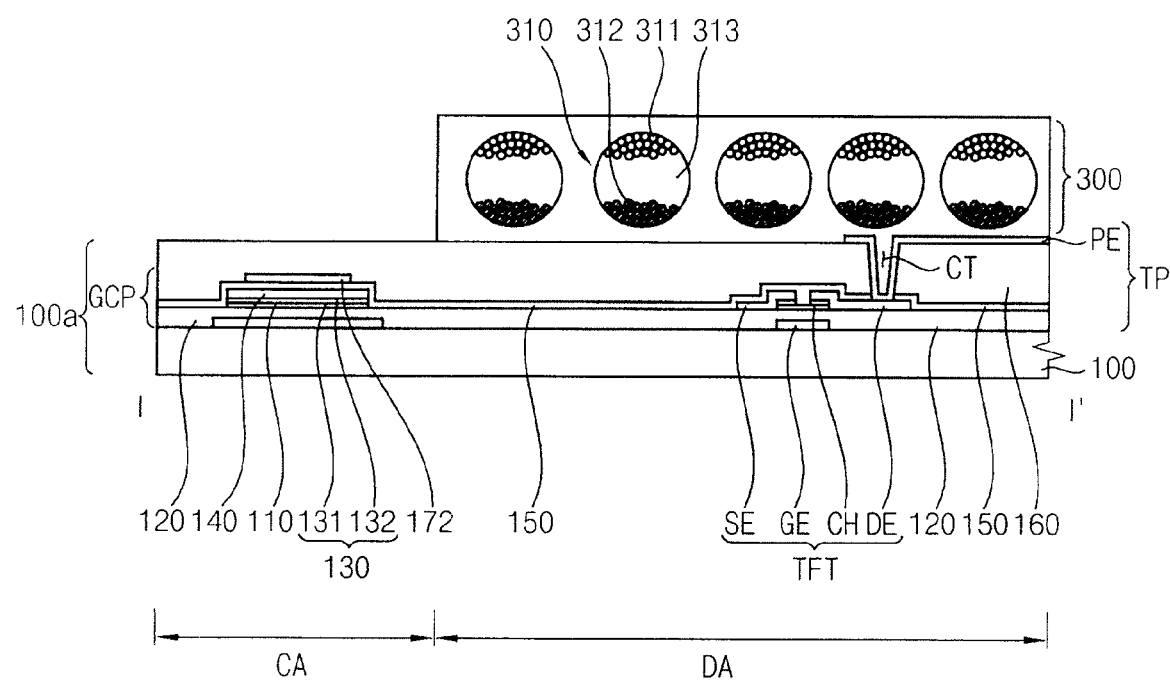

Referring to FIGS. 1 and 6B, the electro-optical layer 300 is formed on the array substrate 100a. The electro-optical layer 300 may be the electrophoretic layer including the electrophoretic molecules charged with the positive (+) charge and the negative (−) charge. The electro-optical layer 300 is formed corresponding to the display area DA of the array substrate 100a.

In the present example embodiment, the electro-optical layer 300 is formed on the array substrate 100a instead of the supporting layer 500.

Figure 6C:
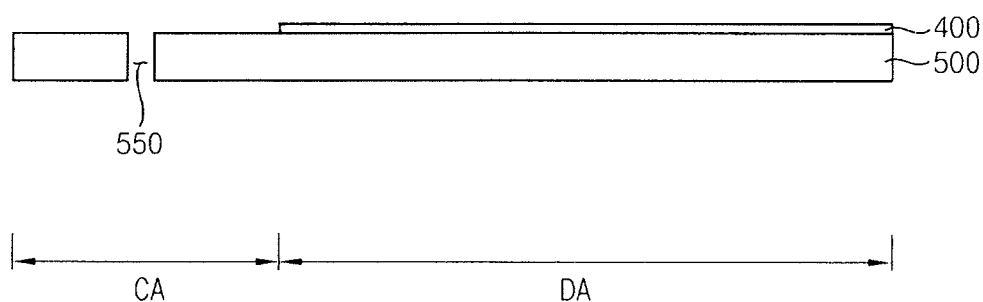

Referring to FIGS. 1 and 6C, the common electrode 400 is formed on the supporting layer 500 including the openings 550, corresponding to the peripheral area. The common electrode 400 is formed corresponding to the display area DA of the array substrate 100a.

Figure 6D:
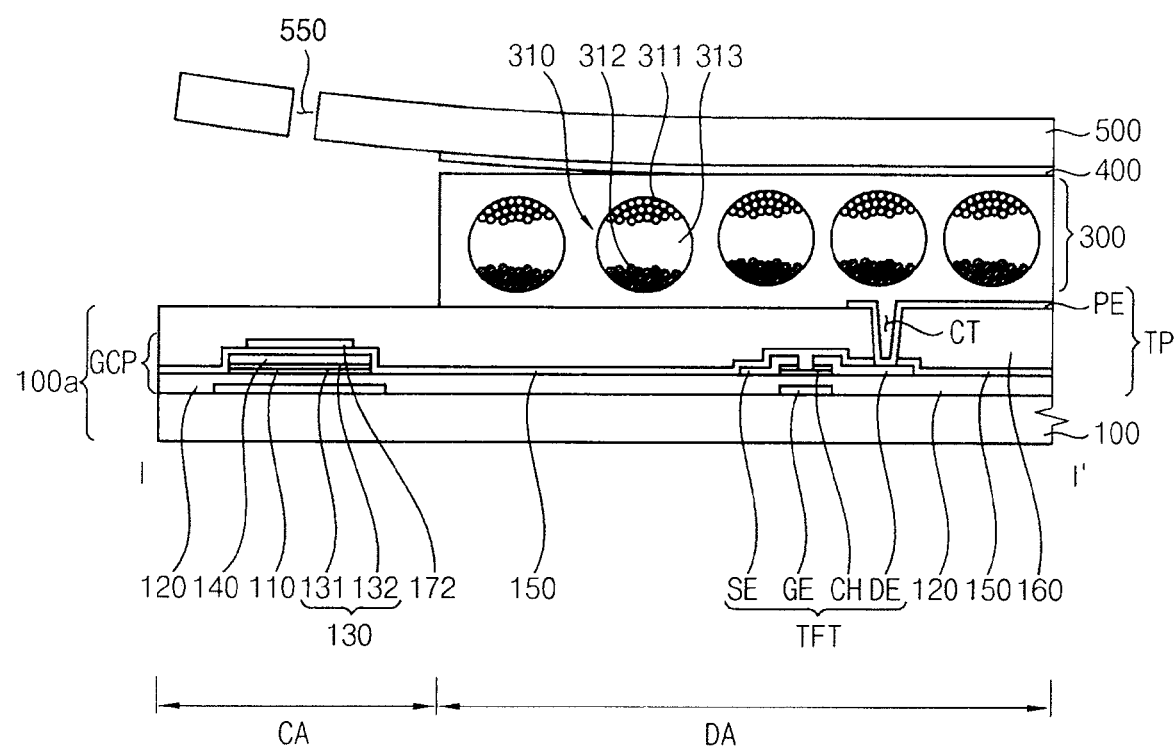

Referring to FIGS. 1 and 6D, the supporting layer 500 including the common electrode 400 is laminated to the array substrate 100a including the electro-optical layer 300.

The pixel electrode PE fonned on the array substrate 100a faces the common electrode 400 fowled on the supporting layer 500.

Figure 6E:
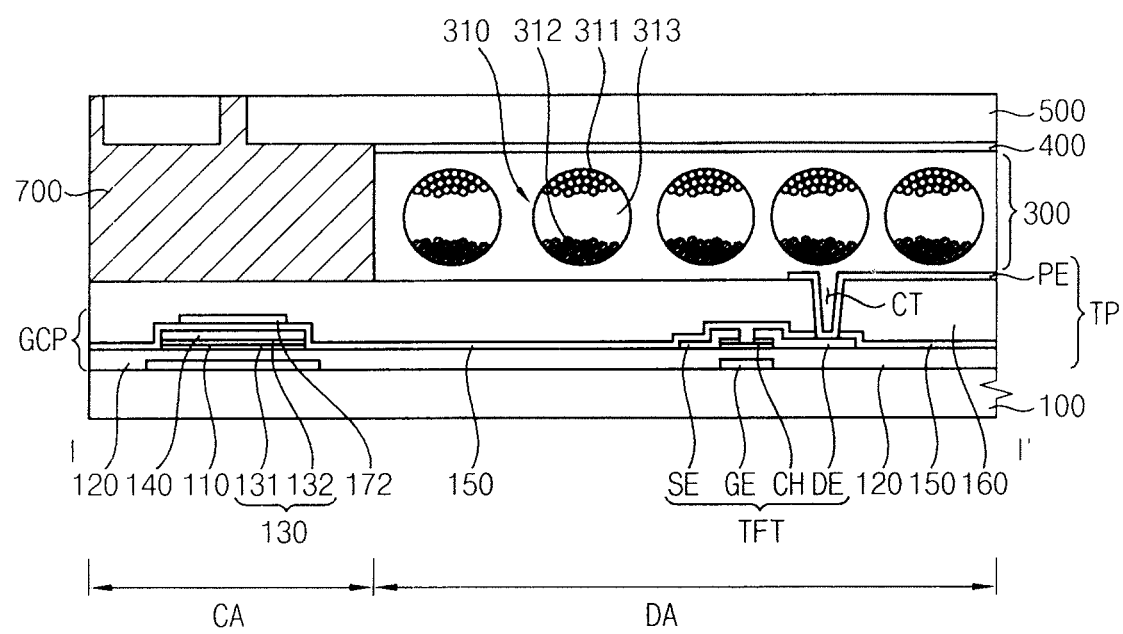

Referring to FIGS. 1 and 6E, the sealant 700 is injected into the openings 550 of the supporting layer 500 to seal the array substrate 100a and the supporting layer 500. The sealant 700 is injected into the openings 550 to fill the openings 550, the empty space 570 and the non-overlapping area 590.

When the distance between the openings 550 and the outermost line of the supporting layer 500 is more than the predetermined distance, the sealant 700 may be additionally injected through the non-overlapping area 590 after injecting the sealant 700 into the openings 550.

Figure 7:
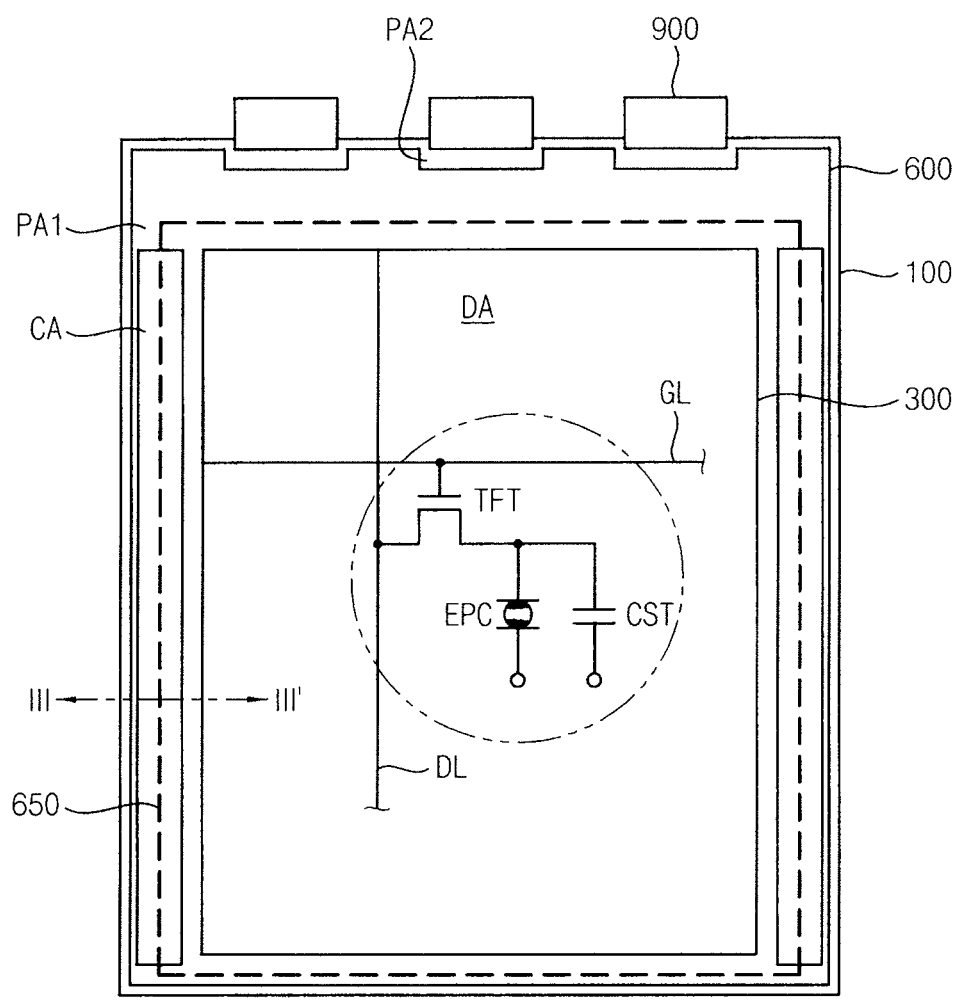
FIG. 7 is a plan view illustrating a display panel according to an example embodiment of the present invention.

FIG. 7 is a plan view illustrating a display panel according to still another example embodiment of the present invention. FIG. 8 is a cross-sectional view illustrating the display panel taken along a line III-III' of FIG. 7.

In the display panel according to the present example embodiment, substantially the same elements as those of FIG. 1 are referenced using the same reference numerals, and further description for substantially the same elements will be omitted.

Referring to FIGS. 7 and 8, the display panel 20 includes a substrate 100, an electro-optical layer 300, a supporting layer 500 and a barrier layer 600. The display panel 20 may further include a common electrode 400 disposed between the electro-optical layer 300 and the supporting layer 500. The display panel 20 may further include a flexible printed circuit board 900 electrically attached to a portion of the substrate 100.

The supporting layer 500 is formed on the common electrode 400. The supporting layer 500 covers the display area DA. In the present example embodiment, the supporting layer 500 does not cover the peripheral area unlike the display panel 10 of FIG. 1, but the barrier layer 600 covers the display area DA and the peripheral area.

The barrier layer 600 is formed on the substrate 100 on which the supporting layer 500 is formed. The barrier layer 600 covers the display area DA and the gate circuit part GCP.

When viewed on the plane, the barrier layer 600 may cover the display area DA and almost all of the peripheral area of the substrate 100. The barrier layer 600 includes openings 650 formed in the peripheral area. The openings 650 may be formed between an outermost line of the display area DA and an outermost line of the barrier layer 600. For example, the openings 650 may be formed over the gate circuit part GCP.

The barrier layer 600 may include, for example, at least one of a polyethyleneterephthalate (PET) resin, a polyarylate (PAR) resin, a polymethylmethacrylate (PMMA) resin and a polycarbonate resin, and combination thereof. For example, the barrier layer 600 may have thickness between about 220 µm and about 250 µm.

FIGS. 9A to 9E are cross-sectional views illustrating a method of manufacturing the display panel of FIG. 7 according to still another example embodiment of the present invention.

In the method of manufacturing the display panel according to the present example embodiment, substantially the same elements as in FIGS. 5A to 5G are referenced to using the same reference numerals, and further description for substantially the same elements will be omitted. In addition, description for the carrier substrate 20 will be omitted.

Referring to FIGS. 7 and 9A, the thin-film transistor part TP is formed in the display area DA and the gate circuit part GCP is formed in the circuit area CA of the peripheral area, on the substrate 100. Based on the above, the array substrate 100a is manufactured.

Figure 9B:
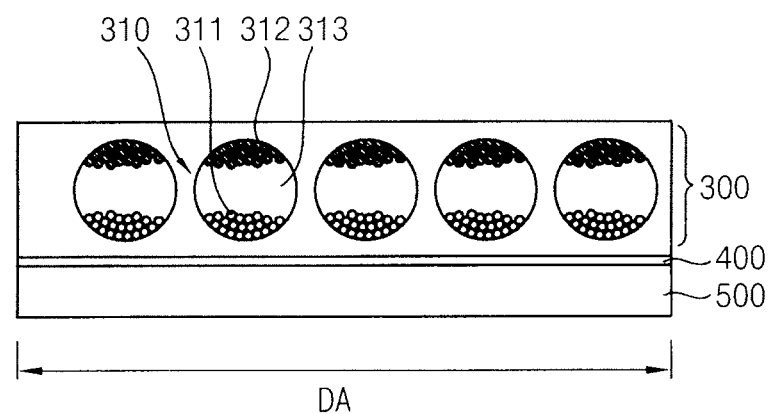

Referring to FIGS. 7 and 9B, the common electrode 400 and the electro-optical layer 300 are formed on the supporting layer 500.

Alternatively, the electro-optical layer 300 may be formed on the array substrate 100a instead of the supporting layer 500.

Figure 9C:
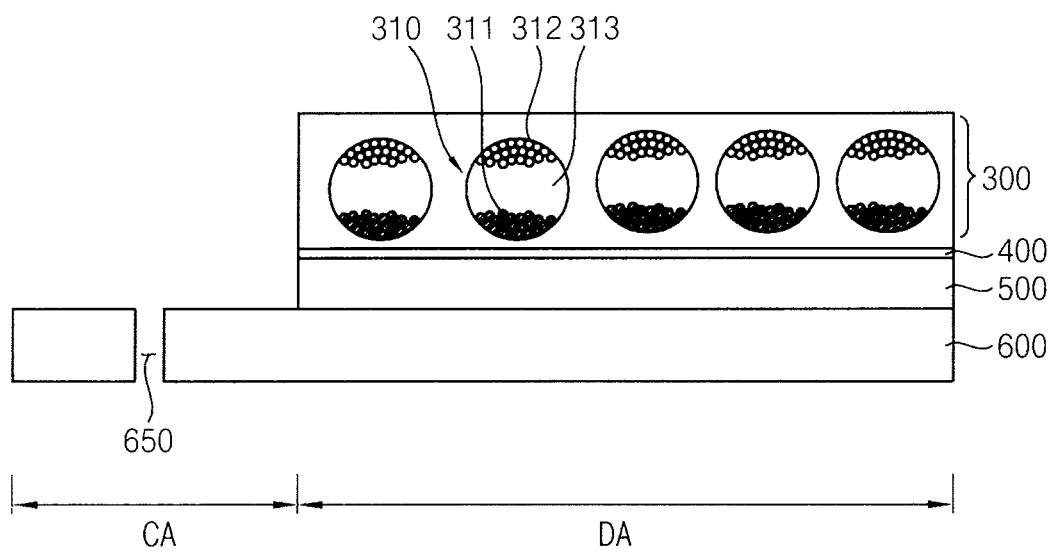

Referring to FIGS. 7 and 9C, the barrier layer 600 is formed a lower surface of the supporting layer 500 on which the common electrode 400 and the electro-optical layer 300 are formed.

The barrier layer 600 includes openings 650 formed in the peripheral area. For example, the openings 650 may be formed over the gate circuit part GCP.

Figure 9D:
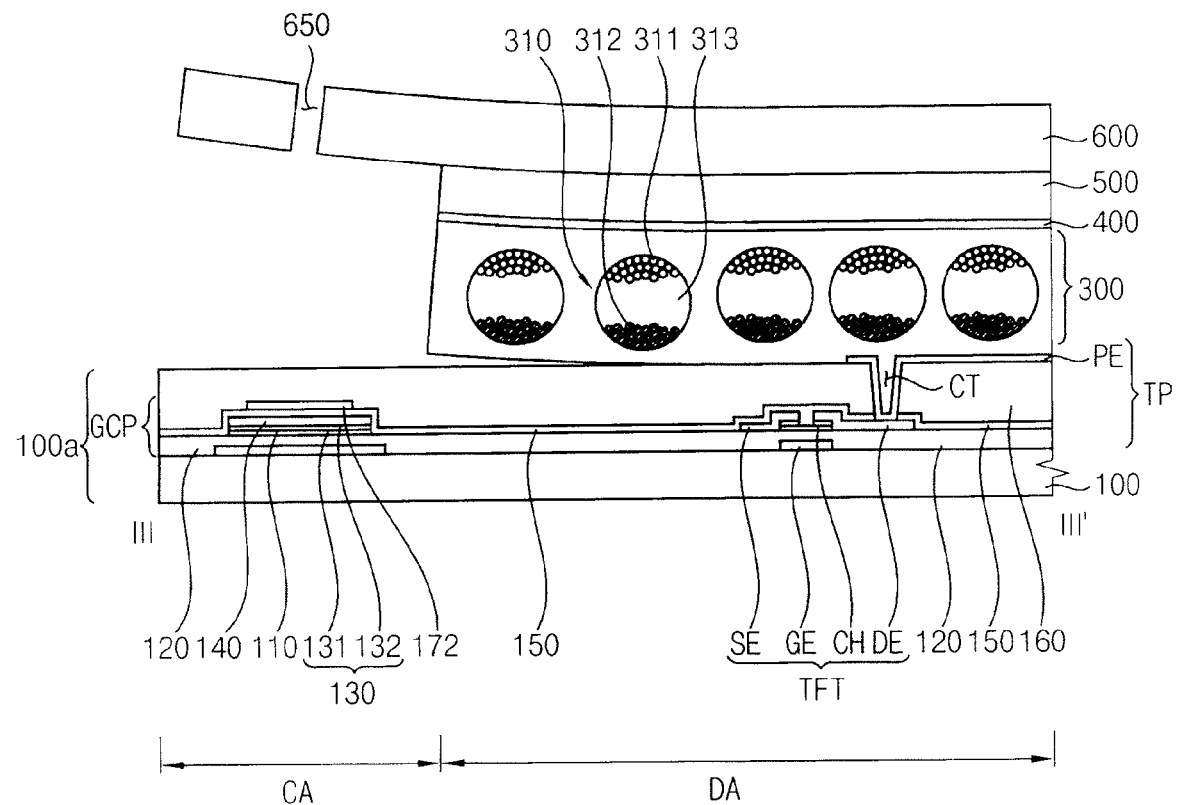

Referring to FIGS. 7 and 9D, the supporting layer 500 on which the barrier layer 600, the common electrode 400 and the electro-optical layer are formed thereon is laminated to the array substrate 100a. The pixel electrode PE formed on the array substrate 100a faces the common electrode 400 formed on the supporting layer 500. The barrier layer 600 may cover the display area DA and almost all of the peripheral area.

Figure 9E:
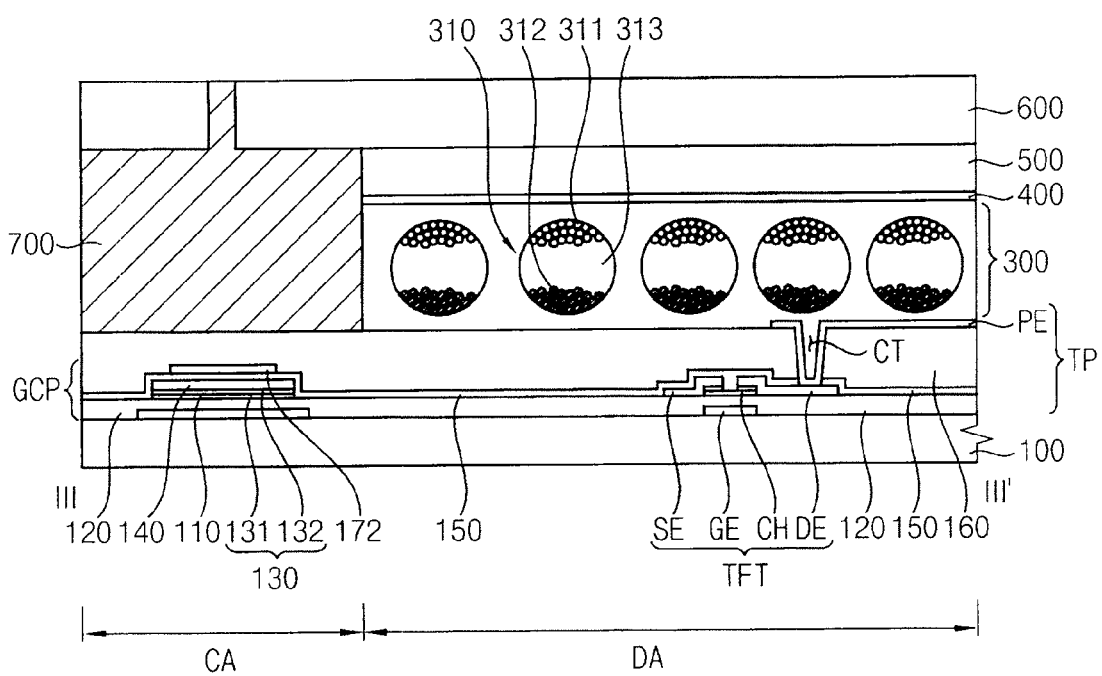

Referring to FIGS. 7 and 9E, the sealant 700 is injected into the openings 650 of the barrier layer 600 to seal the array substrate 100a and the supporting layer 500 on which the barrier layer 600 is formed.

The barrier layer 600 covers the peripheral area including the gate circuit part GCP as well as the display area DA, so that the substrate 100 may be prevented from sagging. In addition, the barrier layer 600 covers the gate circuit part GCP to function as a barrier layer, so that damage resulting from, for example, moisture, light, heat, chemical impact, etc., may be prevented.

According to the example embodiments of the present invention, the supporting layer or the barrier layer may decrease the cost for manufacturing the display panel, and may prevent the substrate from sagging and may protect the gate circuit part. In addition, the sealant is injected into the openings that are formed through the supporting layer or the barrier layer, so that the display panel may be better sealed.

Having described the example embodiments of the present invention, it is further noted that it is readily apparent to those of reasonable skill in the art that various modifications may be made without departing from the spirit and scope of the invention which is defined by the metes and bounds of the appended claims.

What is claimed is:

1. A method of manufacturing a display panel, the method comprising:
   forming a thin film transistor (TFT) part in a display area of a substrate, the substrate including the display area and a peripheral area surrounding the display area;
   forming a common electrode on a supporting layer in the display area, the supporting layer covering both the display area and the peripheral area, wherein the supporting layer includes openings therethrough in the peripheral area;

attaching the supporting layer having the common electrode formed thereon to the substrate; and injecting a sealant through the openings to seal the substrate and the supporting layer.

2. The method of claim 1, further comprising:

forming an electro-optical layer on the common electrode.

3. The method of claim 1, further comprising:

forming an electro-optical layer in the display area of the substrate including the TFT part.

4. The method of claim 1, further comprising:

additionally injecting the sealant on a portion of the substrate that does not overlap with the supporting layer.

5. The method of claim 1, wherein the supporting layer has a thickness between about 220 μm and about 250 μm.

* * * * *